United States Patent
Krajnovich et al.

(10) Patent No.: US 6,798,613 B1
(45) Date of Patent: Sep. 28, 2004

(54) METHOD OF CORRECTING Z-HEIGHT ERRORS DURING ASSEMBLY OF A HARD DISK DRIVE

(75) Inventors: Douglas J. Krajnovich, Santa Clara, CA (US); Tadashi Yogi, San Jose, CA (US)

(73) Assignee: Maxtor Corporation, Longmont, CO (US)

( * ) Notice: Subject to any disclaimer, the term of this patent is extended or adjusted under 35 U.S.C. 154(b) by 131 days.

(21) Appl. No.: 10/075,211

(22) Filed: Feb. 12, 2002

Related U.S. Application Data
(60) Provisional application No. 60/304,264, filed on Jul. 9, 2001.

(51) Int. Cl.[7] ................................................. G11B 5/48
(52) U.S. Cl. ............................. 360/97.01; 360/99.12; 360/245.2
(58) Field of Search .......................... 360/97.01, 98.01, 360/99.08, 99.12, 75, 102, 245.2, 265.9

(56) References Cited

U.S. PATENT DOCUMENTS

| | | | | |
|---|---|---|---|---|
| 5,343,345 A | * | 8/1994 | Gilovich | 360/264.7 |
| 5,457,589 A | * | 10/1995 | Leuthold et al. | 360/99.12 |
| 5,459,627 A | * | 10/1995 | Peter | 360/98.08 |
| 5,590,006 A | * | 12/1996 | Shafe | 360/254.8 |
| 5,692,289 A | * | 12/1997 | Amada et al. | 29/603.03 |
| 5,729,403 A | * | 3/1998 | Schuh | 360/97.03 |
| 5,886,852 A | * | 3/1999 | Kikuchi et al. | 360/98.08 |
| 6,011,239 A | | 1/2000 | Singh et al. | 219/121.6 |
| 6,069,766 A | * | 5/2000 | Battu et al. | 360/97.01 |
| 6,215,625 B1 | * | 4/2001 | Carlson | 360/244.7 |
| 6,229,677 B1 | * | 5/2001 | Hudson et al. | 360/266.1 |
| 6,252,744 B1 | * | 6/2001 | Kelemen | 360/256.2 |
| 6,359,759 B1 | * | 3/2002 | Congdon et al. | 360/294.7 |
| 6,388,842 B1 | * | 5/2002 | Murphy | 360/244.8 |
| 6,405,449 B1 | * | 6/2002 | Sundaram et al. | 33/645 |
| 6,412,042 B1 | * | 6/2002 | Paterson et al. | 711/112 |
| 6,493,170 B1 | * | 12/2002 | Kato et al. | 360/75 |
| 6,504,667 B1 | * | 1/2003 | Sugawara | 360/75 |
| 6,570,736 B2 | * | 5/2003 | Noda | 360/97.01 |
| 6,590,732 B2 | * | 7/2003 | Kitagawa et al. | 360/75 |
| 6,624,967 B1 | * | 9/2003 | Suwito | 360/98.08 |
| 6,624,968 B1 | * | 9/2003 | Chessman et al. | 360/99.12 |
| 6,631,047 B2 | * | 10/2003 | Ishizuka et al. | 360/77.03 |

FOREIGN PATENT DOCUMENTS

| | | | |
|---|---|---|---|
| JP | 63-292468 A | * | 11/1988 |
| JP | 1-251381 A | * | 10/1989 |

* cited by examiner

*Primary Examiner*—Jefferson Evans
(74) *Attorney, Agent, or Firm*—James P. Broder; Steven G. Roeder

(57) ABSTRACT

A disk drive includes a drive housing, an actuator arm mounted to the drive housing, a head suspension assembly secured to the actuator arm, a spindle secured to the drive housing, a storage disk positioned on the spindle and a spacer positioned on the spindle. The actuator arm includes a suspension mounting side and the spindle includes a disk mounting surface. A actual measured distance along a first axis between the suspension mounting side and the disk mounting surface is measured. The spacer is positioned between the disk mounting surface and the storage disk. The spacer has a spacer height along the first axis that is based upon the actual measured distance.

60 Claims, 9 Drawing Sheets

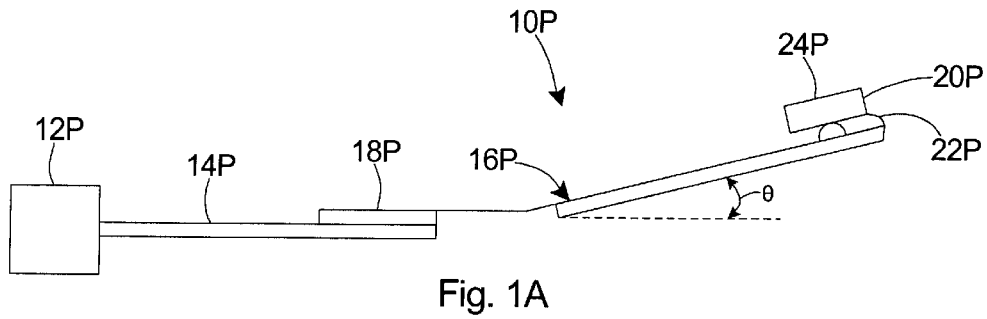
Fig. 1A
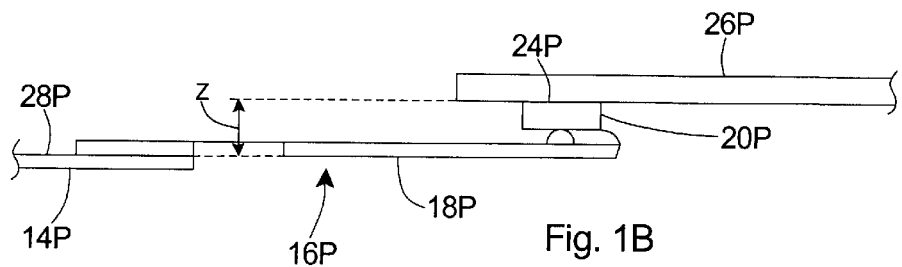
Fig. 1B
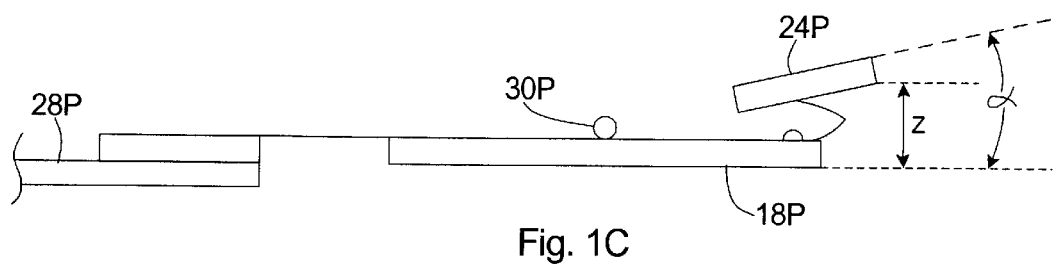
Fig. 1C
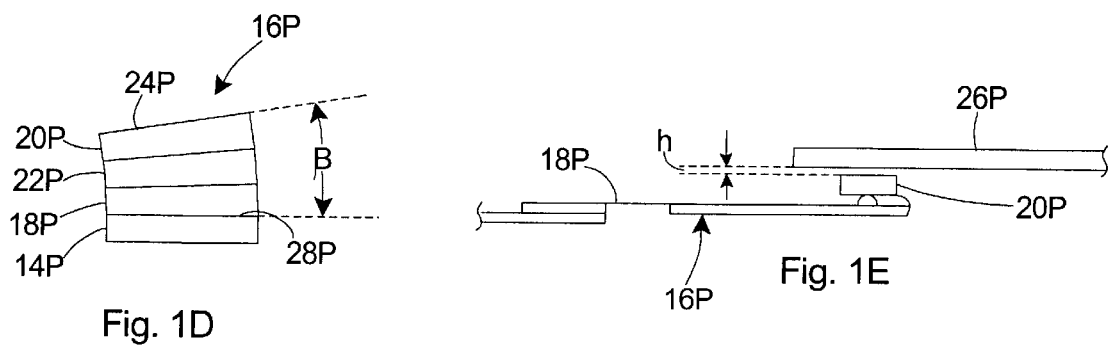
Fig. 1D
Fig. 1E

METHOD OF CORRECTING Z-HEIGHT ERRORS DURING ASSEMBLY OF A HARD DISK DRIVE

RELATED APPLICATION

This application claims the benefit on U.S. Provisional Application Ser. No. 60/304,264, filed on Jul. 9, 2001, the contents of which are incorporated herein by reference.

FIELD OF THE INVENTION

The present invention relates an apparatus and method for correcting the Z-height, gram load, pitch static attitude and/or the roll static attitude during assembly of a hard disk drive.

BACKGROUND

Magnetic recording hard disk drives are widely used in computers and data processing systems for storing information in digital form. These disk drives commonly include (i) a drive housing having a base and a pivot, (ii) one or more rotating storage disks, (iii) one or more actuator arms that are mounted on the pivot, and (iv) one or more head suspension assemblies. Each storage disk typically includes one or more tracks.

FIG. 1A illustrates a prior art head actuator assembly 10P including an actuator hub 12P, an actuator arm 14P, and a head suspension assembly 16P having a load beam 18P, a slider 20P, and a flexure 22P that secures the slider 20P to the load beam 18P. The slider 20P includes an air bearing surface 24P. The load beam 18P is bent at an angle θ. As is well known in the art, an additional head suspension assembly (not shown) is typically attached to the bottom surface of the actuator arm 14P. Further, the head actuator assembly 10P typically includes a plurality of actuator arms 14P, each having one or more head suspension assemblies 16P.

FIG. 1B illustrates the relationship of a prior art head suspension assembly 16P to a storage disk 26P when the storage disk 26P is not rotating. In this position, the head suspension assembly 16P is in a "loaded" state. In the loaded state, the load beam 18P is bent so that the angle θ (illustrated in FIG. 1A) is reduced from the angle θ illustrated in FIG. 1A and the angle θ is typically greater than zero. Because the load beam 18P resists this deformation, a force, commonly referred to as the gram load, is transmitted to the slider 20P. The distance between the air bearing surface 24P of the slider 20P and a top mounting side 28P of the actuator arm 14P is commonly referred to as the Z height.

FIG. 1C illustrates a prior art view of the load beam 18P being held in the loaded state by a pin 30P. In this configuration, an angle α is defined by the air bearing surface 24P and the top surface 28P. The angle α is referred to as the pitch static attitude (PSA) of the slider 20P.

FIG. 1D illustrates a prior art end view of the head suspension assembly 16P with the load beam 18P held in the loaded state. An angle β is defined by the horizontal tilt of the air bearing surface 24P of the slider 20P relative to the top mounting side 28P of the actuator arm 14P. The angle β is referred to as the roll static attitude (RSA) of the slider 20P. The term "static attitude" is used to describe either the PSA or the RSA, or both parameters together. The load beam 18P and the flexure 22P are also illustrated in FIG. 1D.

FIG. 1E illustrates a prior art view of the relationship of the head suspension assembly 16P to the storage disk 26P when the storage disk 26P is rotating. The rotation of the storage disk 26P causes the slider 20P to ride on an air bearing a distance "h" from the storage disk 26P. The distance "h" is referred to as the "flying height" of the slider 20P and represents the position that the slider 20P occupies when the storage disk 26P is rotating during normal operation of the disk drive. The load beam 18P and a portion of the actuator arm 14P are also illustrated in FIG. 1E.

The need for increased storage capacity, compact construction, and reduced cost has led to disk drives having fewer storage disks, with each storage disk having increased track density. As track density increases, it is necessary to decrease the flying height of the slider and have tighter control on the flying height. More specifically, if the flying height is not maintained within a certain range, the quality of the data transferred to and from the storage disk is degraded. As a result thereof, accurately controlling the flying height of the slider is critical to the accurate transfer and/or retrieval of information from the storage disk.

The flying height of the slider is influenced by a number of factors, including the rotation speed of the storage disk, the design of the air bearing surfaces of the slider, the pitch static attitude, the roll static attitude, the gram load, and the Z height. For example, the flying height is often higher than nominal if the Z height is higher than nominal. More specifically, when the Z height is higher than nominal, the pitch static attitude is more positive than desired and the gram load is lower than desired. All three of these factors cause an increase in the flying height. This problem is further aggravated if the pitch static attitude is higher than nominal when measured at a nominal Z-height and/or the gram load is lower than nominal when measured at the nominal Z-height.

Accordingly, one way of attempting to achieve the desired flying height includes closely controlling the Z-height. Typically, the Z-height of a disk drive depends on the stack-up of many tolerances, including but not limited to the position of the pivot relative to the base, the pivot height relative to the base, and the thickness and flatness of the actuator arm. Typically, the height of the storage disk relative to the base is very precise. Thus, the Z-height can be controlled by closely controlling the individual dimensions and tolerances that determine the Z-height. In other words, tolerances can be tightened so that the actuator arm is brought to the proper Z-height relative to the disk. However, tightening tolerances increases the cost of manufacturing.

Still another way to achieve the desired flying height includes controlling and adjusting the gram load, the pitch static attitude and the roll static attitude. For example, a laser can be used to adjust the pitch static attitude, the roll static attitude and the gram load after the head suspension assembly has been merged into the storage disks. In this design, a harmonic ratio flying height detector is used to estimate the flying height by writing a signal on the disk having a read back spectrum that is constant along the track and which has nonzero amplitude for at least two different frequencies. If the flying height is estimated to be too high or too low, the laser directs one or more laser beams at the load beam to adjust the pitch static attitude, the roll static attitude and/or the gram load. Subsequently, the harmonic ratio flying height detector is again used to estimate the flying height. If the flying height is again too high or too low, the laser again directs one or more laser beams at the load beam to adjust the pitch static attitude, the roll static attitude and/or the gram load. This process is repeated until the desired flying height is determined by the harmonic ratio flying height detector.

Unfortunately, this process is not very practical because the harmonic ratio flying height detector is not very accurate at measuring the flying height and access to load beams that are merged between the storage disks is extremely limited.

In light of the above, the need exists to provide a way to narrow the distribution of the flying heights, the Z-heights, the gram loads, the pitch static attitudes and the roll static attitudes in a population of disk drives. Another need exists to provide a disk drive with reduced track misregistration. Yet another need exists to provide a disk drive that is relatively easy and cost effective to manufacture.

SUMMARY

The present invention is directed to a disk drive that includes a drive housing, an actuator arm mounted to the drive housing, a head suspension assembly secured to the actuator arm, a spindle secured to the drive housing, a storage disk positioned on the spindle and a spacer positioned on the spindle. The head suspension assembly includes a slider. The actuator arm includes a suspension mounting side and the spindle includes a disk mounting surface. The spacer is positioned between the disk mounting surface and the storage disk.

With the present invention, a measurement is taken after the actuator arm has been secured to the drive housing. The measurement relates to an actual Z height of the disk drive. As a result of the measurement, an adjustment is made that influences flying height. For example, an actual measured distance along a first axis between the suspension mounting side and the disk mounting surface is measured and the spacer has a spacer height along the first axis that is based upon the actual measured distance. The disk drive has a desired Z height between the suspension mounting side and the storage disk that provides for a good flying height between the slider and the storage disk. With the present design, the spacer height is selected so that the actual Z height is very close to the desired Z height.

In one embodiment of the present invention, the spacer is selected from a group that includes a first spacer having a first spacer height and a second spacer having a second spacer height that is different from the first spacer height. In this embodiment, the first spacer is positioned on the spindle if the first spacer height is closer than the second spacer height to the actual measured distance plus the desired Z height and the second spacer is positioned on the spindle if the second spacer height is closer than the first spacer height to the actual measured distance plus the desired Z height. Stated another way, if the actual distance is equal to X1, the first spacer is positioned on the spindle and if the actual distance is equal to X2, the second spacer is positioned on the spindle.

Further, with the head suspension assembly secured to the drive housing, the gram load, the pitch static attitude, and/or the roll static attitude can be directly measured and adjusted at the actual Z height of the disk drive.

The present invention also includes a method for manufacturing a disk drive. The method includes the steps of providing a drive housing, securing a spindle to the drive housing, the spindle having a disk mounting surface, securing an actuator arm to the drive housing, the actuator arm having a suspension mounting side, and measuring to determine the positions along a first axis between the suspension mounting side and the disk mounting surface.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 1A is a side view of a head suspension assembly in an unloaded state according to the prior art;

FIG. 1B is a side view of a head suspension assembly in a loaded state according to the prior art;

FIG. 1C is a side view of a head suspension assembly according to the prior art;

FIG. 1D is an end view of a head suspension assembly in a loaded state according to the prior art;

FIG. 1E is a side view of a head suspension assembly illustrating the flying height according to the prior art;

DESCRIPTION

The present invention improves the likelihood that each disk drive in a population of drives is close to the nominal Z height by measuring the position of an actuator arm relative to a spindle and inserting a spacer of appropriate thickness between the spindle and a storage disk. The present invention also improves the likelihood that each disk drive in a population of drives is close to the nominal gram load, pitch static attitude, and roll static attitude by measuring the gram load, pitch static attitude, and roll static attitude at an actual Z height and adjusting a suspension to achieve the nominal gram load, pitch static attitude, and roll static attitude. The present invention is particularly useful with a single-headed drive platform because only one head needs to be brought into mechanical alignment.

Figure 2:
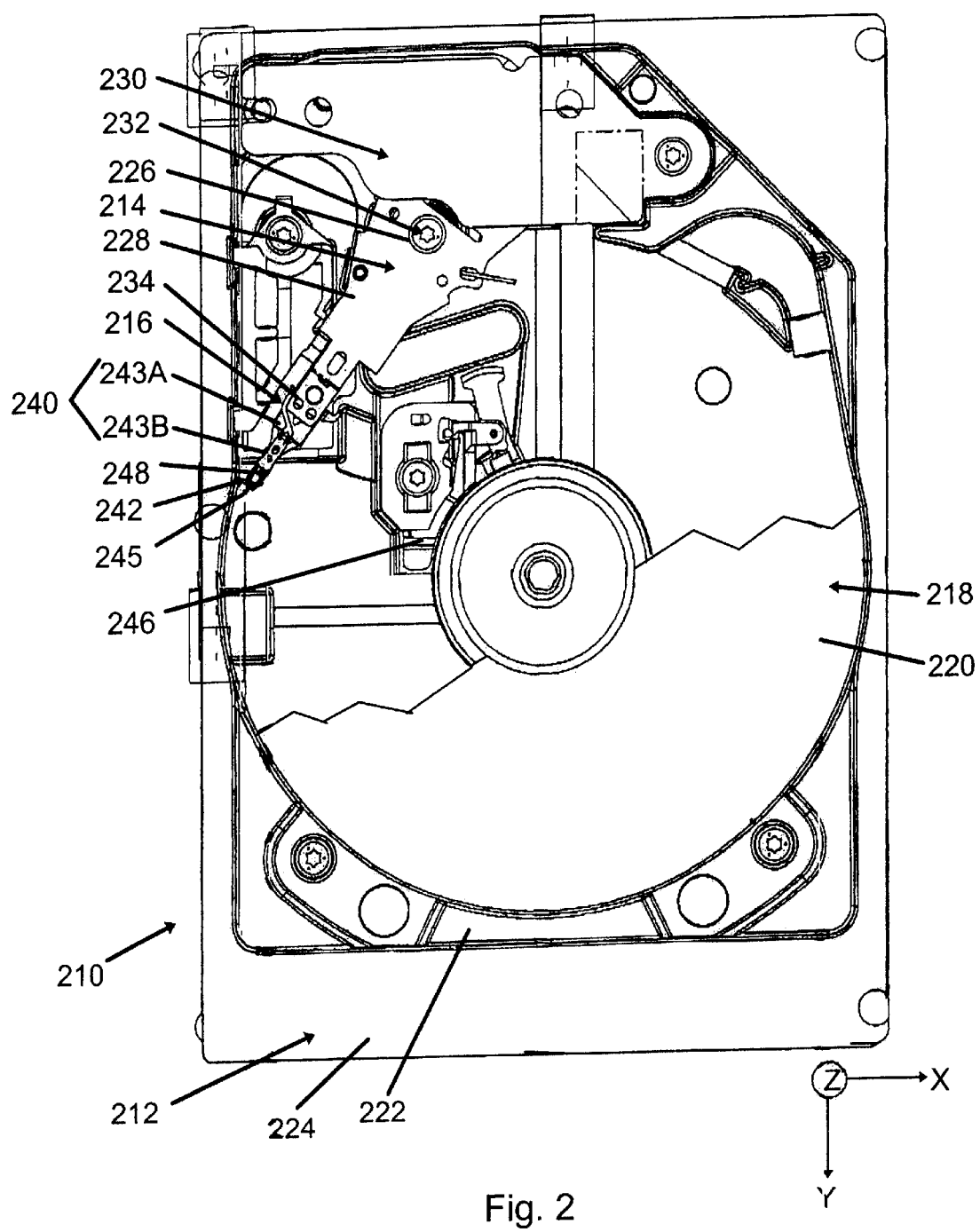
FIG. 2 is a simplified, partly cut-away top plan view of a disk drive having features of the present invention.

Referring initially to FIG. 2, a disk drive 210 according to the present invention includes (i) a drive housing 212, (ii) a head arm assembly 214 having a head suspension assembly 216 and (iii) a disk assembly 218 including a magnetic storage disk 220. The drive housing 212 retains the various components of the disk drive 210. The drive housing 212 can include a base 222, four (4) side walls 224 and a cover (not shown).

Some of the Figures provided herein include a coordinate system that designates an X axis, a Y axis that is orthogonal to the X axis, and a Z axis that is orthogonal to the X axis and the Y axis. The Z axis is also referred to as a first axis. It should be understood that the coordinate system is merely for reference and can be varied. For example, the Z axis can be switched with the Y axis or the X axis. In the FIG. 2, the Z axis is illustrated as being substantially perpendicular to the base 222 and the storage disk 220.

The head arm assembly 214 includes (i) an actuator hub 226, (ii) an actuator arm 228, (iii) a portion of an actuator motor 230, and (iv) the head suspension assembly 216. The actuator hub 226 is rotatably mounted to an actuator pivot 232 that is secured to the base 222. The actuator arm 228 cantilevers from the actuator hub 226 and includes a suspension mounting side 234. The actuator motor 230 moves the actuator arm 228 and the head suspension assembly 216 relative to the storage disk 220. The actuator motor 230 includes a coil secured to the actuator hub 226 and a pair of spaced-apart magnets.

The head suspension assembly 216 includes a suspension 240, a slider 242 and one or more read/write heads (not shown). The suspension 240 includes a load beam 243A and a flexure 243B that secures the slider 242 to the load beam 243A. The load beam 243A is secured to suspension mounting side 234 of the actuator arm 228 and cantilevers away from the actuator arm 228. The load beam 243A is flexible in a direction perpendicular to the storage disk 220 and acts as a spring for supporting the slider 242. The load beam 243A can be made of stainless steel.

The load beam 243A can include a lifting feature 245 that engages a ramp 246 that is positioned near the storage disk 220. The ramp 246 can be positioned near the inner diameter of the storage disk 220 as illustrated in FIG. 2 or near an outer diameter of the storage disk 220. The lifting feature 245 engages the ramp 246 to unload the slider 242 from the storage disk 220.

The slider 242 includes one or more fluid bearing surfaces 248. With this design, rotation of the storage disk 220 causes the slider 242 to fly at a predetermined flying height spaced apart from the storage disk 220. The flying height, for example, can be 20 nanometers or less to ensure accurate data transfer. The flying height of the slider 242 is controlled by many factors, including the rotation speed of the storage disk 220, the design of the fluid bearing surface 248, the design of the suspension 240, the actual Z-height, the actual gram load, the actual pitch static attitude, and the actual roll static attitude of the assembled disk drive 210.

Additionally, the disk drive 210 can include an inner diameter stop and an outer diameter stop that limit the rotary travel of the head arm assembly 214. The inner diameter stop prevents the head arm assembly 214 from crashing the slider 242 into the disk assembly 218. The outer diameter stop prevents the head arm assembly 214 from moving the slider 242 radially outward past the outer diameter of the storage disk 220.

Figure 3:
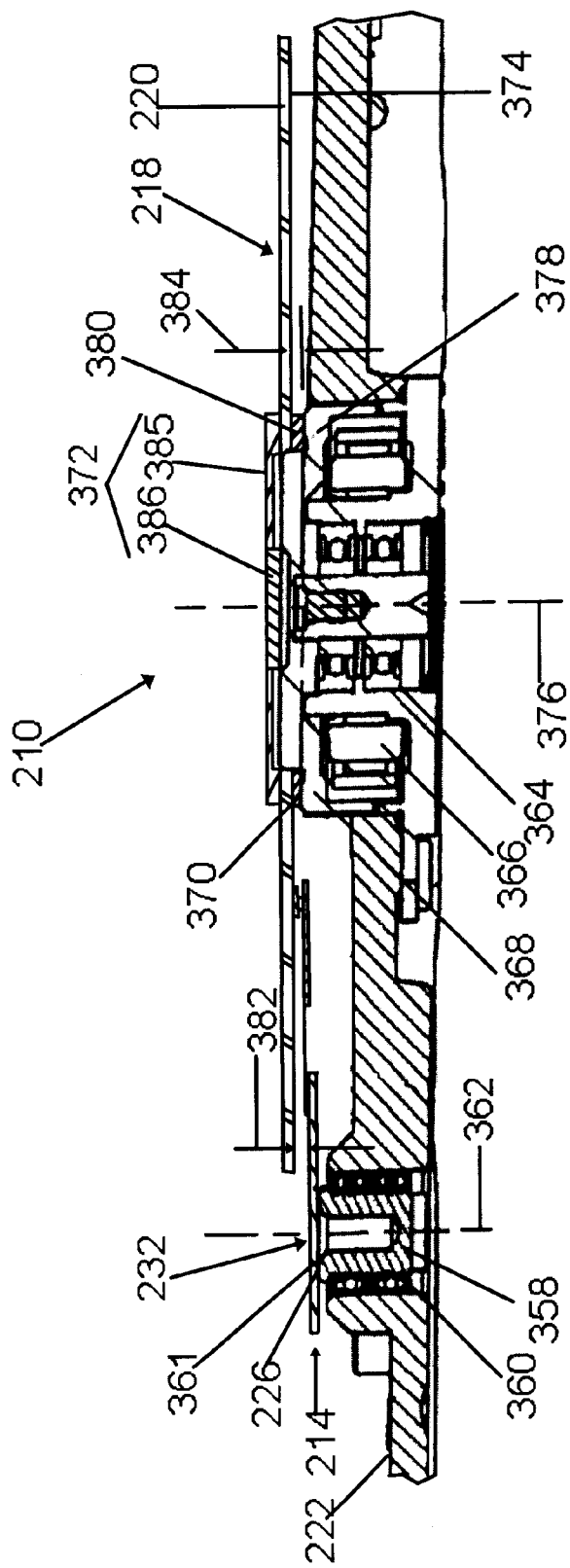
FIG. 3 is a simplified, side cut-away illustration of a portion of the disk drive.

FIG. 3 illustrates a cut-away illustration of a portion of the disk drive 210, including the base 222, the actuator hub 226, the actuator pivot 232, the head arm assembly 214, and the disk assembly 218. The actuator pivot 232 includes a fastener 358, and an actuator bearing assembly 360. The actuator bearing assembly 360 includes an outer race that is fixed within an aperture in the base 222 and an inner race that rotates relative to the base 222 and the outer race. The inner race includes a hub mounting surface 361 for maintaining the actuator hub 226 above the base 222. The bearing assembly 360 allows for rotation of the actuator hub 226 about an arm axis 362. The fastener 358, e.g. a bolt, secures the actuator hub 226 to the inner race of the actuator bearing assembly 260.

The disk assembly 218 includes the storage disk 220, a spindle bearing assembly 364, a spindle motor 366, a spindle 368, a spacer 370, and a disk clamp 372. The storage disk 220 can include a data storage surface on each side or only on one side. FIG. 3 illustrates a single storage disk 220 having a single data storage surface 374 that is positioned on the bottom of the storage disk 220. Alternately, for example, the single data storage surface could be on the top of the storage disk.

The spindle bearing assembly 364 secures the spindle 368 to the base 222 and allows for rotation of the spindle 368 and the storage disk 220 about a disk axis 376. In FIG. 3, an outer race of the spindle bearing assembly 364 is secured to the base 222 while an inner race is secured to the spindle 368. Typically, the disk axis 376 is substantially parallel with the arm axis 362 and the disk axis 376 is substantially perpendicular to the base 222. The spindle motor 366 rotates the spindle 368 and the storage disk 220 at a predetermined angular velocity.

A portion of the spindle 368 fits within and supports the storage disk 220 and the spacer 370. The spindle 368 includes an annular shaped, mounting flange 378. The mounting flange 378 includes a disk mounting surface 380 that supports the spacer 370. It should be noted that the height of the mounting flange 378 is reduced from that of a typical drive, to make room for the spacer 370 below the storage disk 220. The amount that the mounting flange 378 is reduced can be varied. As an example, the mounting flange 378 can be reduced by approximately 0.040" to allow for room for the spacer 370.

The spacer 370 is sized and shaped so that actual Z height 382 of the disk drive 210 is approximately equal to the desired Z height of the disk drive 210. Stated another way, the spacer 370 is sized to bring the storage disk 220 close to the desired Z height relative to the actuator arm 228. The spacer 370 illustrated in FIG. 3 is generally ring shaped and encircles a portion of the spindle 368. The spacer 370 has an inner diameter that is slightly greater than the outer diameter of a portion of the spindle 362 and an outer diameter that is approximately equal to that of the mounting flange 378. As provided in detail below, a spacer height 384 of the spacer 370 is adjusted so that an actual Z height 382 of the disk drive 210 is approximately equal to a desired Z height "Z." Stated another way, the present invention enhances the likelihood that the actual Z-height is approximately equal to the desired Z-height. This can facilitate a consistent flying height during movement of the slider 242 across the storage disk 220.

The construction of and the materials used for the spacer 370 can vary. For example, the spacer 370 can be made of rigid, lightweight materials, such as aluminum, plastics, lightweight metals, ceramics, or reinforced composites.

The disk clamp 372 fixedly secures the storage disk 220 to the spindle 368 and clamps the storage disk 220 against the spacer 370. The disk clamp 372 includes a cap 385 and a fastener 386. The cap 385 includes a disk shaped section and an annular lip section that extends downwardly from the disk shaped section. The fastener 386 engages the spindle 368 and pulls the lip section 386 against the storage disk 220. It should be noted that a space exists between the disk shaped section and the top of the spindle 368 to allow for alternately sized spacers 370. However, the size of the space is greatly exaggerated in FIG. 3.

Figure 4A:
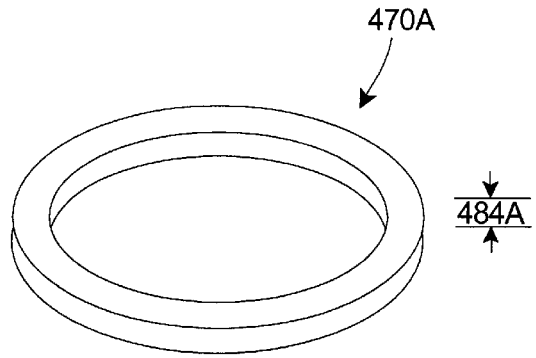
FIGS. 4A–4E each illustrate a perspective view of an alternate spacer having features of the present invention.
Figure 4B:
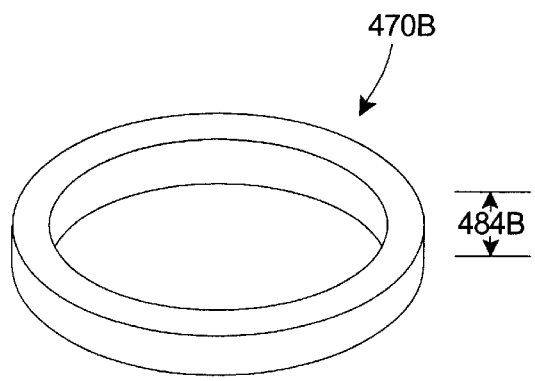
Figure 4C:
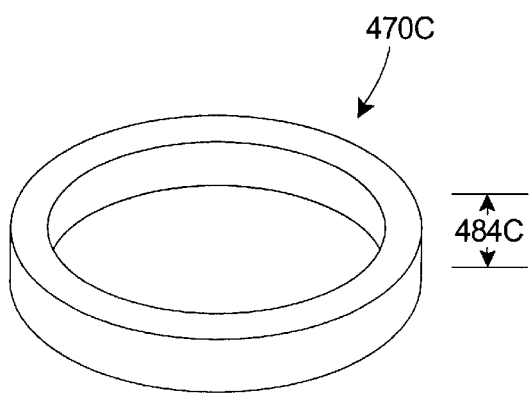
Figure 4D:
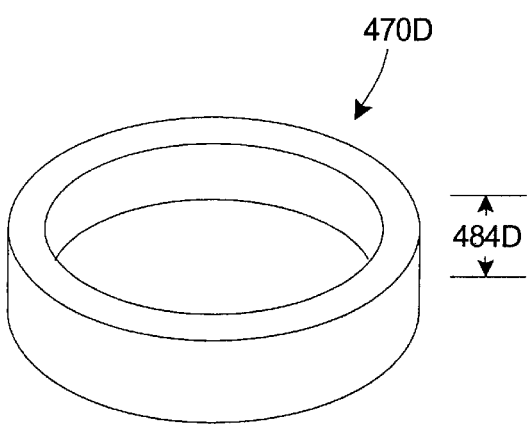

FIGS. 4A–4E each illustrate a perspective view of alternate suitable, spacers that can be utilized in the disk drive. More specifically, FIG. 4A illustrates a first spacer 470A having a first spacer height 484A, FIG. 4B illustrates a second spacer 470B having a second spacer height 484B that is slightly greater than the first spacer height 484A, FIG. 4C illustrates a third spacer 470C having a third spacer height 484C that is slightly greater than the second spacer height 484B, and FIG. 4D illustrates a fourth spacer 470D having a fourth spacer height 484D that is slightly greater than the third spacer height 484C. The exact spacer heights 484A–484D can be varied. For example, the spacer heights 484A–484D can vary between approximately 0.001 inches and 0.1 inches, and the difference between the spacer heights 484A–484D between the spacers 470A–470D can be between approximately 0.001 inches and 0.01 inches. As an example, the first spacer height 484A can be approximately 0.035 inches, the second spacer height 484B can be approximately 0.04 inches, the third spacer height 484C can be approximately 0.045 inches, and the fourth spacer height 484D can be approximately 0.05 inches.

Figure 4E:
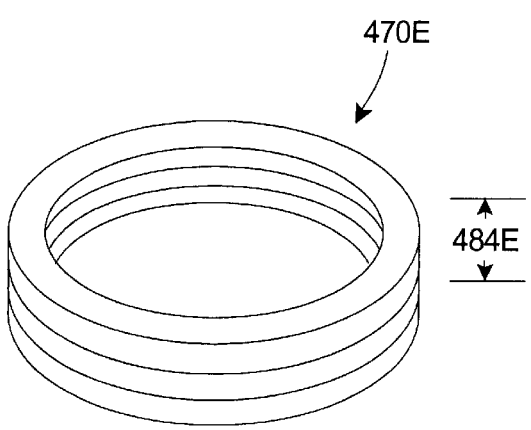

FIG. 4E illustrates that the spacer 470E can include multiple, relatively thin, annular shaped sections 480 that are stacked sequentially to have the desired spacer height 384E. With this design, the number of sections 480 can be changed to achieve the desired spacer height 484E.

Figure 5:
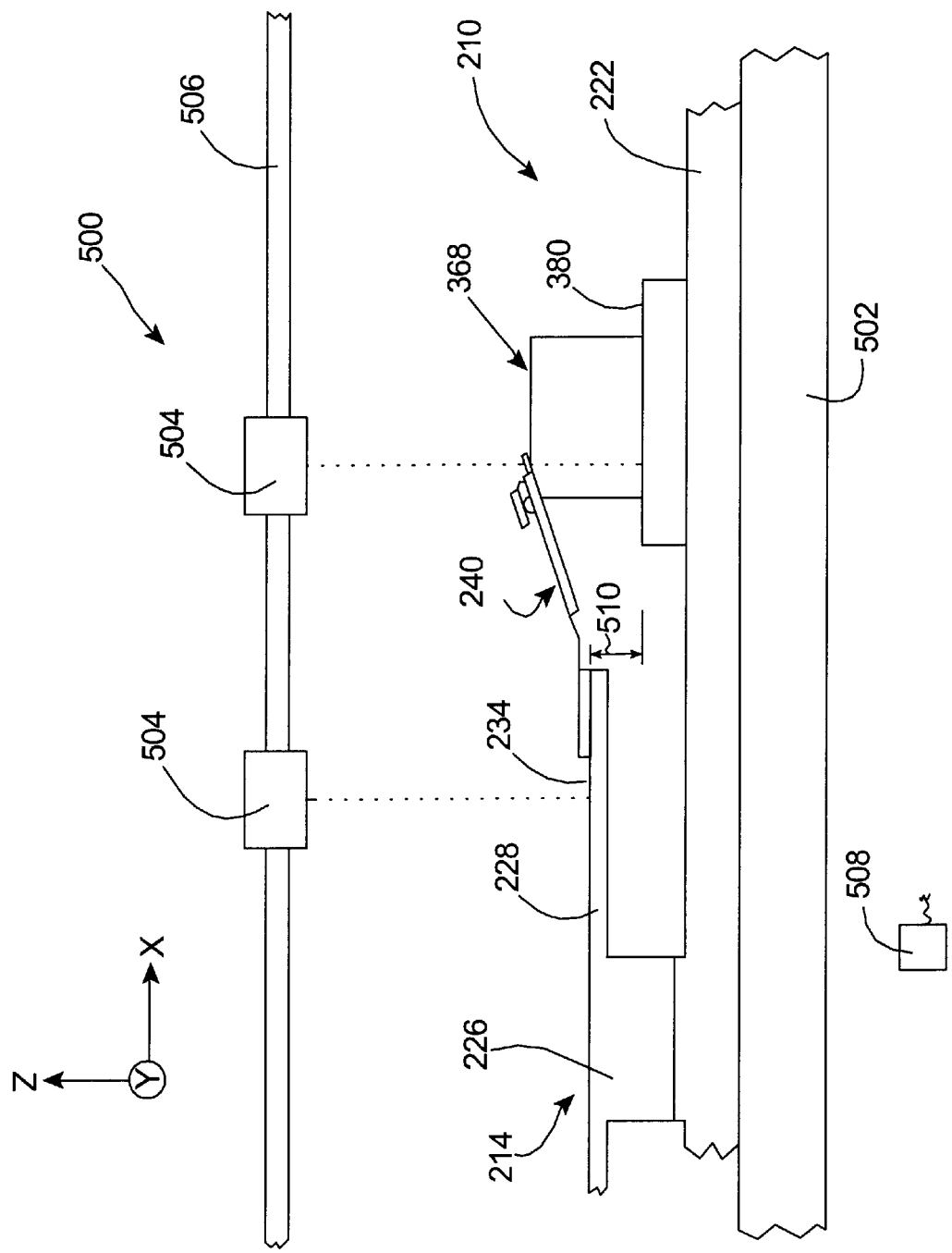
FIG. 5 is a simplified, side illustration of a portion of a disk drive at a first manufacturing station.

FIG. 5 illustrates a simplified, side view of a partly assembled disk drive 210 at a first manufacturing station 500. FIG. 5 illustrates that the head arm assembly 214 and the spindle 368 have been secured to the base 222 prior to adding one of the spacers (not shown in FIG. 5) and the storage disk (not shown in FIG. 5) to the disk drive 210.

The first manufacturing station 500 includes a station base 502, a measuring device 504 (illustrated in two alternate positions), a rail 506, and a controller 508. The station base 502 retains the base 222 of the disk drive 210. The measuring device 504 is used to determine an actual, measured distance 510 along the Z axis between the suspension mounting side 234 and the disk mounting surface 380. Stated another way, for each drive 210, the measuring device 504 exactly measures the relative position along the Z axis between the suspension mounting side 234 and the disk mounting surface 380. With this information, the controller 508 can determine which of the spacers 470A–470D (illustrated in FIGS. 4A–4D) should be utilized to achieve the desired Z height and what the actual Z height of the disk drive 210 will be.

The design of the measuring device 504 can be varied. For example, the measuring device 504 can (i) measure the relative position of the suspension mounting side 234 along the Z axis and (ii) measure the relative position of the disk mounting surface 380 along the Z axis. With this information, the controller 508 can determine the actual measured distance 510 by subtracting the measured position of the suspension mounting side 234 along the Z axis from the measured position of the disk mounting surface 380 along the Z axis. Alternately, the measuring device 504 can directly measure the actual distance 510 along the Z axis between the suspension mounting side 234 and the disk mounting surface 380. Still alternately, with the suspension 240 secured to the actuator arm 228, the measuring device 504 could measure the distance along the Z axis between the top of the suspension 240 near the suspension mounting side 234 and the disk mounting surface 380. Subsequently, the actual distance 510 could be determined by subtracting the thickness of the suspension 240.

The measuring device 504 can be a contact probe or a non-contact type measuring device such as capacitance sensor, an optical sensor, a laser interferometer, and/or some other type of measuring device.

In FIG. 5, the measuring device 504 is a contact probe that is moved along the rail 506. First, the measuring device 504 measures to the position of the suspension mounting side 234 along the Z axis. Subsequently, the measuring device 504 is moved along the rail 506 so that the measuring device 504 can measure the position of the disk mounting surface 380 along the Z axis.

It should be noted that for the discussions herein, the actual measured distance 510 will be a positive number when the disk mounting surface 380 is lower along the Z axis than the suspension mounting side 234. For example, in FIG. 5, the actual measured distance 510 will have a positive value. Alternately, if the suspension mounting side 234 is lower along the Z axis than the disk mounting surface 380, the actual measured distance 510 will have a negative value.

Additionally, it should be noted that the actual distance 510 is determined after the head arm assembly 214 and the spindle 368 have been attached the base 222. The head arm assembly 214 pivots relative to the disk spindle 368 during movement of the slider 242 from the inner diameter of the storage disk to the outer diameter of the storage disk. It should be noted that the actual distance 510 can be measured at a single rotational position of the head arm assembly 214 anywhere in the stroke of the head arm assembly 214, or the actual distance 510 can be an average of a number of measurements taken at number of alternate rotational positions of the head arm assembly 214. For example, the actual distance 510 can be determined by averaging (i) the measured distance with the head arm assembly 214 near the inner diameter stop before the lifting feature engages the ramp, (ii) the measured distance with the head arm assembly 214 rotated against the outer diameter stop and (iii) the measured distance with the head arm assembly 214 rotated intermediate the previous two positions. Stated another way, the actual distance 510 can be measured at two or more alternate positions of the head arm assembly 214.

In FIG. 5, the measured distance 510 at the suspension mounting side 234 is measured from near the suspension 240 with the suspension 240 secured to the actuator arm 228. Alternately, the measured distance 510 at the suspension mounting side 234 could be measured from near the actuator hub 226. Still alternately, the measured distance could be measured prior to securing the suspension 240 and/or the slider 242 to the actuator arm 228.

The controller 508, for example, can be a desktop computer that includes software for performing the calculations required herein, including processing the output data from the measuring device 504 and determining the actual measured distance 510. The controller 508 uses the actual measured distance 510 to determine which spacer should be positioned on the spindle 368 so that the disk drive 210 will be close to the desired Z height 382 (illustrated in FIG. 3) of the disk drive 210.

Figure 6:
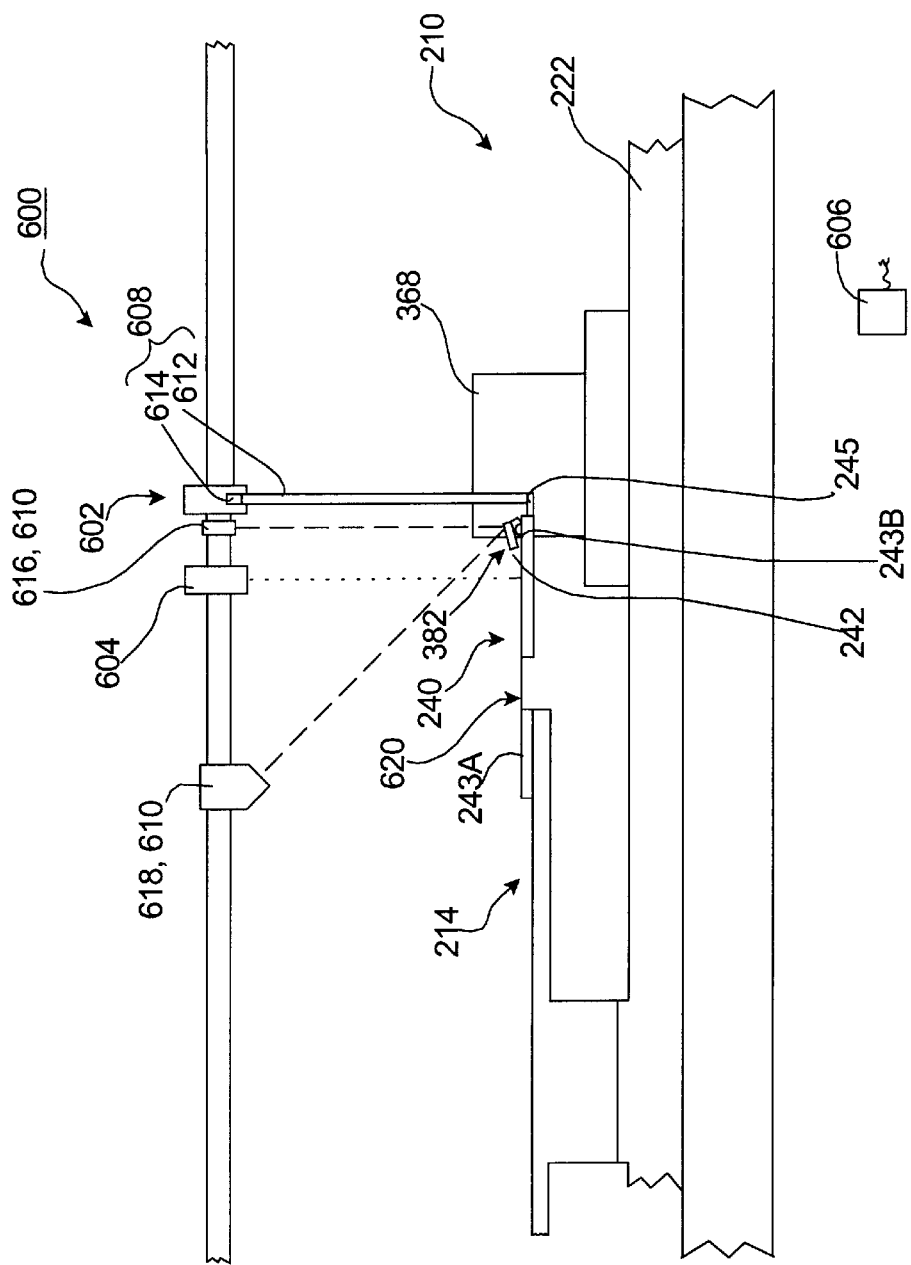
FIG. 6 is a simplified, side illustration of a portion of a disk drive at a second manufacturing station.

FIG. 6 illustrates a simplified, side view of the partly assembled disk drive 210 including the base 222, the head arm assembly 214 secured to the base 222 and the spindle 368 secured to the base 222 at a second manufacturing station 600. The second manufacturing station 600 can be used to directly measure the gram load, the pitch static attitude and/or the roll static attitude at the actual Z height 382. Further, the second manufacturing station 600 can also be used to precisely adjust the gram load, the pitch static attitude and the roll static attitude at the actual Z height 382. Because the storage disk is not installed at this time, there is space to directly measure and adjust the gram load and the static attitudes.

In FIG. 6, the second manufacturing station 600 includes a measuring assembly 602, an adjusting device 604, and a controller 606. The measuring assembly 602 measures the gram load, the pitch static attitude, and/or the roll static attitude of the slider 242. In the embodiment illustrated in FIG. 6, the measuring assembly 602 includes a gram load tester 608 and a static attitude tester 610. The gram load tester 608 measures the gram load. In FIG. 6, the gram load tester 608 includes a deflecting probe 612 and a load cell 614. The deflecting probe 612 engages the suspension 240, e.g. at the lifting feature 245, and deflects the suspension 240 until the slider 242 is maintained at the actual Z height 382. The load cell 614 measures the force required to maintain the slider 242 at the actual Z height 382. The measured force is equal to the gram load at the actual Z height 382.

The static attitude tester 610 can include a laser 616 (e.g. a helium-neon laser or diode laser) which is positioned to illuminate the slider 242 or the flexure 243B, and project a pattern of reflected light onto a detector 618, such as a chart, a diode array or a charge coupled device. The pattern of reflected light is then compared to a standard pattern to yield the pitch static attitude and/or the roll static attitude at the actual Z height 382.

The adjusting device 604 is used to adjust the gram load, the pitch static attitude and/or the roll static attitude to nominal values at the actual Z height 382. The gram load, pitch static attitude, and the roll static attitude can be adjusted by mechanically bending the suspension 240. Alternately, the adjusting device 604 can use focused light from an infrared lamp for a few seconds onto the suspension 246. The duration of the heating is controlled so that the load beam 243A and/or the flexure 243B after relaxation reaches the desired value. Alternately, the adjusting device 604 can include a pulsed laser and/or a continuous wave laser that direct laser beams at the suspension 240. The pulsed laser can be a 532 nm Q-switched frequency doubled Nd:YAG laser (Neodymium:Yttrium-Aluminum-Garnet laser), or a 1064 nm Q-switched Nd:YAG laser. The continuous wave laser can be a diode array laser or a diode pumped solid state laser. However, other types of pulsed lasers and continuous wave lasers could be used.

The irradiation of different regions of the suspension 240 effects the suspension 240 differently. For example, irradiation with the pulsed laser in a hinge region 620, on the top side of the load beam 243A, results in an increase in the gram load. In contrast, irradiation with the pulsed laser in the hinge region on the bottom side of the load beam 243A, results in a decrease in the gram load. Alternately, irradiation of the hinge region 620 on the top side of the load beam with the continuous wave laser decreases the gram load. Thus, the gram load can be increased or decreased by irradiating the hinge region 620 with a laser.

Further, irradiation of the suspension 240 with the lasers can change the pitch static attitude and the roll static attitude. Specifically, irradiation of the load beam 243A at single or multiple sites across the width bends the load beam 243A slightly in a manner that changes the pitch static attitude. Similarly, irradiation of the load beam 243A along only part of the width bends the load beam 243A slightly in a manner that changes the roll static attitude.

In general, to cause a change in the pitch static attitude and the roll static attitude, the laser can be directed anywhere on the suspension 240, including on the flexure 243B. However, it may be preferable to have the laser directed outside of the hinge region 620 and in the vicinity of the slider 242 because this will decouple pitch static attitude changes and the roll static attitude changes from changes which affect the gram load.

Generally, irradiation of a region with the continuous wave laser will cause the static attitude to change in the opposite direction as is obtained when the pulsed laser is used to irradiate the same region. Therefore, use of the continuous wave laser in combination with the pulsed laser allows the static attitude to be adjusted in one direction and then readjusted back in the opposite direction.

A discussion of a suitable adjusting device 604 is provided in U.S. Pat. No. 6,011,239, issued to Singh et al., the contents of which are incorporated herein by reference.

The controller 606 processes the information from the measuring assembly 602 and controls the adjusting device 604. For example, the controller 606 can be a desktop computer including software for processing the output data from the measuring assembly 602 and calculating the quantity of radiation from the lasers and the locations required to adjust the suspension 240 by the desired amount.

The following procedure can be used at the second manufacturing station 600 to adjust the gram load, the pitch static attitude and the roll static attitude.

1. Directly measuring the gram load, the pitch static attitude and the roll static attitude at a known position, e.g. the actual Z height 382, after the head arm assembly 214 has been secured to the base 222 using the measuring assembly 602.

2. If the values of the gram load and the static attitudes are not nominal, calculate using the controller 606 where and how much energy should be directed to the suspension 240 to change the originally measured gram load, the pitch static attitude and the roll static attitude to the desired gram load, the desired pitch static attitude and the desired roll static attitude.

3. Using the adjusting device 604 to direct the energy to one or more areas of the suspension 240 while simultaneously monitoring the gram load, the pitch static attitude and the roll static attitude at the known position, with the measuring assembly 602.

4. Discontinue directing energy to the suspension 240 when the desired gram load, the pitch static attitude and the roll static attitude are measured by the measuring assembly 602.

5. Remeasure the gram load, the pitch static attitude and the roll static attitude using the measuring assembly 602 to ensure that these values are within nominal range.

Figure 7:
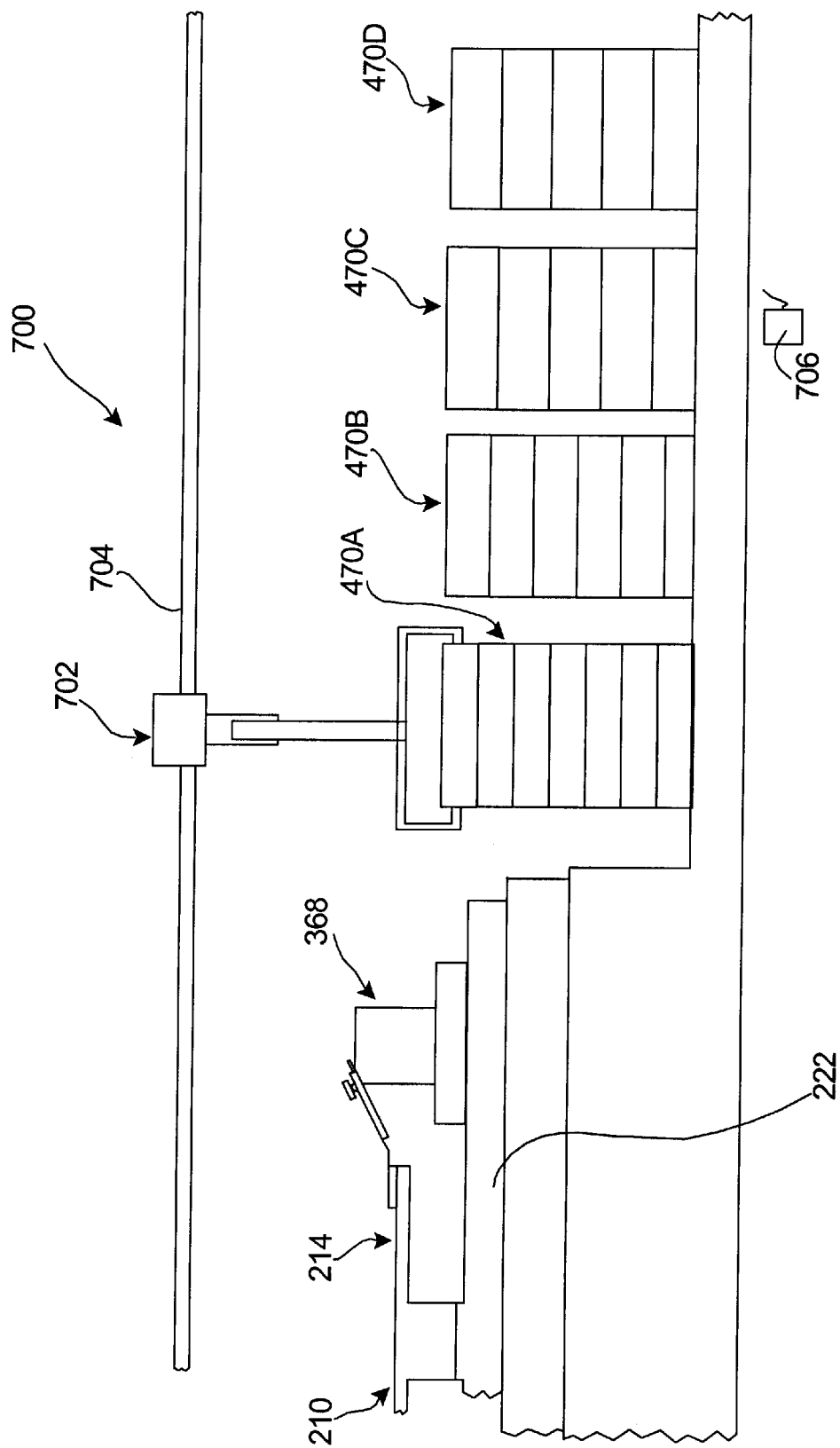
FIG. 7 is a simplified, side illustration of a portion of the disk drive at a third manufacturing station.

FIG. 7 illustrates a simplified, side view of a portion of the disk drive 210 at a third manufacturing station 700. The third manufacturing station 700 includes a plurality of the first spacers 470A, a plurality of the second spacers 470B, a plurality of the third spacers 470C, a plurality of the fourth spacers 470D, a spacer positioner 702, a rail 704, and a controller 706. FIG. 7 illustrates that the head arm assembly 214 and the spindle 368 have been secured to the base 222 prior to adding one of the spacers 470A–470D and the storage disk (not shown in FIG. 7) to the disk drive 210.

The spacer positioner 702 selectively grips the appropriate spacer 470A–470D and positions the spacer 470A–470D on the spindle 368. In FIG. 7, the spacer positioner 702 is a robot that moves along the rail 704 between the plurality of spacers 470A–470D and the spindle 368. Stated another way, the spacer positioner 702 grips the appropriate spacer from an assortment of predefined spacers 470A–470D having alternate spacer heights 470A–470B.

The controller 706 processes information from the measuring device 504 (illustrated in FIG. 5) and selects the appropriate spacer 470A–470D that will provide the desired Z height. To determine the appropriate spacer 470A–470D, the controller 706 first determines the desired spacer height by adding the desired Z height "Z" to the actual measured distance 510. Once, the desired spacer height is determined, the controller 706 determines which of the spacers 470A–470D has a spacer height 470A–470D that is closest to the desired spacer height. Stated another way, the controller 706 utilizes the actual measured distance 510 to calculate the spacer height of a spacer that would bring the storage disk into perfect Z-height tolerance for this particular drive 210.

As an example, if the actual measured distance 510 is equal to X1, the first spacer height 484A is closest to the desired Z height plus X1, and the first spacer 470A is positioned on the disk spindle 368. Alternately, if the actual measured distance 510 is equal to X2, the second spacer height 484B is closest to the desired Z height plus X2 and the second spacer 470B is positioned on the disk spindle 368. Still alternately, if the actual measured distance 510 is equal to X3, the third spacer height 484C is closest to the desired Z height plus X3 and the third spacer 470C is positioned on the disk spindle 368. Alternately, if the actual measured distance 510 is equal to X4, the fourth spacer height 484D is closest to the desired Z height plus X4 and the fourth spacer 470D is positioned on the disk spindle 368.

The magnitude of the desired Z height can be varied to suit the other components of the disk drive. For example, the desired Z height can be between approximately 23 mils and 43 mils and more specifically approximately 33 mils. However, other desired Z heights can be achieved.

By this approach, the actual Z height for each individual drive 10 will be limited only by the number and spacer height 484A–484D increment of the spacers 470A–470D. With a highly automated operation, the actual measured distance 510 can be determined, the appropriate spacer 470A–470D can be selected and the appropriate spacer 470A–470D can be installed onto the disk spindle 368 relatively quickly.

After the appropriate spacer 470A–470D has been positioned on the disk spindle 368, the storage disk can be positioned on the spindle 368, and the disk clamp can be secured to the disk spindle 368.

Alternately, after the desired spacer height has been determined, for each drive 210, a spacer can be specifically manufactured to the desired spacer height. However, this procedure would slow the production of the disk drive 210.

It should be noted that one or more of the manufacturing stations 500, 600, 700 can be combined. Further, one or more of the procedures provided herein can be used separately and/or alternately for a disk drive. For example, the disk drive can be manufactured without adjusting the gram load, and/or the static attitudes.

Figure 8:
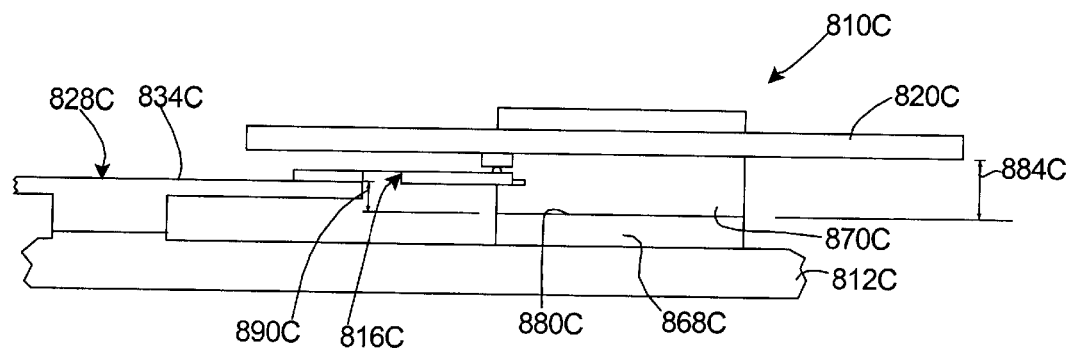
FIG. 8 illustrates a simplified side view of a population of disk drives having features of the present invention.
Figure 8:
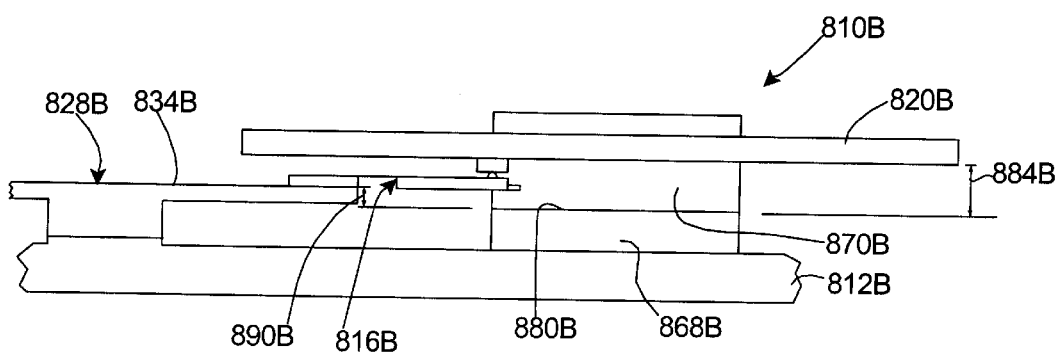
Figure 8:
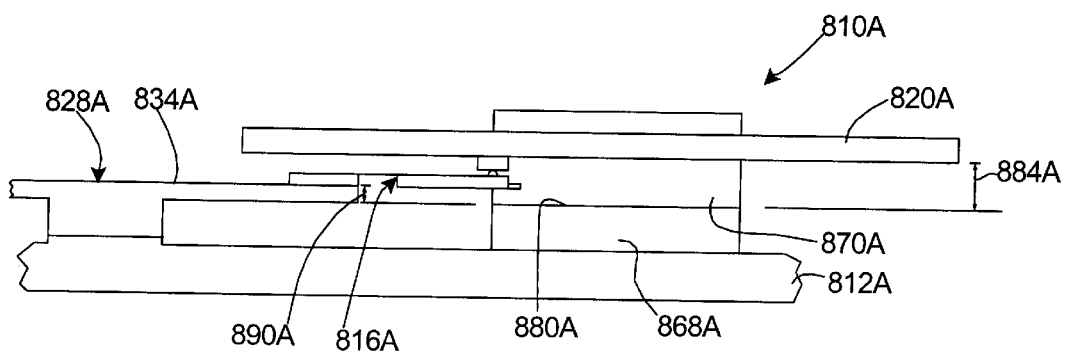

FIG. 8 illustrates a side view of a population 800 of similar single disk, disk drives, including a first disk drive 810A, a second disk drive 810B and a third disk drive 810C. Only a portion of each disk drive 810A–810C is illustrated in FIG. 8.

More specifically, the first disk drive 810A includes (i) a first drive housing 812A; (ii) a first actuator arm 828A including a first suspension mounting side 834A; (iii) a first head suspension assembly 816A that is secured to the first suspension mounting side 834A; (iv) a first spindle 868A having a first disk mounting surface 880A; (v) a first storage disk 820A positioned on the first disk spindle 868A; and (vi) a first disk spacer 870A that maintains the first storage disk 820A spaced apart from the first disk mounting surface 880A, the first disk spacer 870A having a first spacer height 884A.

The second disk drive 810B includes (i) a second drive housing 812B that is substantially similar to the first drive housing 812A; (ii) a second actuator arm 828B including a second suspension mounting side 834B, the second actuator arm 828B being substantially similar to the first actuator arm 828A; (iii) a second head suspension assembly 816B that is substantially similar to the first head suspension assembly 816A; (iv) a second spindle 868B having a second disk mounting surface 880B, the second spindle 868B being substantially similar to the first spindle 868A; (v) a second storage disk 820B that is substantially similar to the first storage disk 820A; and (vi) a second disk spacer 870B having a second spacer height 884B that is greater than the first spacer height 884A.

The third disk drive 810C includes (i) a third drive housing 812C that is substantially similar to the first drive housing 812A and the second drive housing 812B; (ii) a third actuator arm 828C including a third suspension mounting side 834C, the third actuator arm 828C being substantially similar to the first actuator arm 828A and the second actuator arm 828B; (iii) a third head suspension assembly 816C that is substantially similar to the first suspension assembly 816A and the second suspension assembly 816B; (iv) a third spindle 868C having a third disk mounting surface 880C, the third spindle 868C being substantially similar to the first spindle 868A and the second spindle 868B; (v) a third storage disk 820C that is substantially similar to the first storage disk 820A and the second storage disk 820B; and (vi) a third disk spacer 870C having a third spacer height 884C that is greater than the first spacer height 884A and the second spacer height 884B.

In this population 800 of drives, each of the drives 810A–810C has a different actual measured distance 890A, 890B, 890C. More specifically, the first disk drive 810A has an actual measured distance 890A that is less than the actual measured distances 890B, 890C of the other disk drives 810B, 810C and the third disk drive 810C has an actual measured distance 890C that is greater than the actual measured distances 890A, 890B of the other disk drives 810A, 810B. As a result thereof, each of the drives 810A–810C utilizes an alternately sized spacer 810A–810C. The alternately sized spacers 810A–810C allows each of the disk drives 810A–810C of the population of drives 800 to have approximately the same desired Z-height.

With the present design, all of drives 810A–810C will have an actual Z height that is close to the desired Z-height. More specifically, the present invention uses drive level mechanical measurements and adjustments during assembly process to narrow the distribution of Z heights and flying-heights in the population of drives 800. This improves the flying height and allows for the relaxing of some of the existing tight tolerances in the components of the head arm assembly.

Further, the present invention allows the factory to make small tweaks in the population of drives 800 to fine tune the average fly-height by shifting the desired Z-height.

Figure 9:
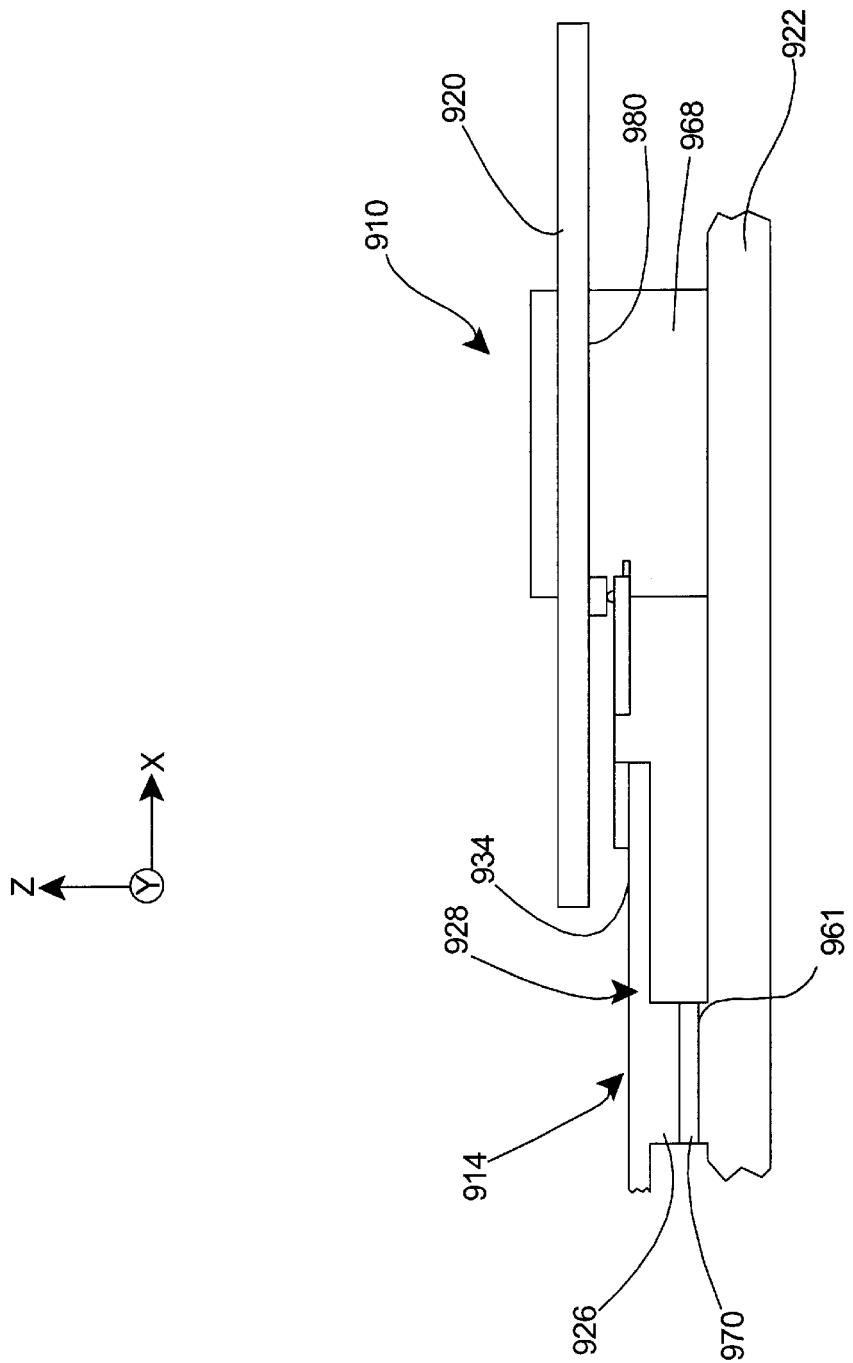
FIG. 9 illustrates a simplified side view of yet another embodiment of a disk drive having features of the present invention.

FIG. 9 illustrates a simplified, side view of a portion of another embodiment of a disk drive 910 having features of the present invention. FIG. 9 illustrates that the base 922, the head arm assembly 914, the spindle 968, the spacer 970 and the storage disk 920. In this embodiment, the spacer 970 is positioned between the actuator hub 926 and the hub mounting surface 961. With this design, the spacer 970 is used to bring the actuator arm 928 up to approximately the desired Z height.

In this embodiment, the head arm assembly 914 and the spindle 968 are first secured to the base 922. Subsequently, the actual measured distance along the Z axis between the suspension mounting side 934 and the disk mounting surface 980 is measured. With this information, the height of the spacer 970 can be determined that would bring the actuator arm 928 into perfect Z-height tolerance for this particular drive 910.

However, in this embodiment, the actuator hub 926 must be removed so that the spacer 970 can be positioned between the actuator hub 926 and the hub mounting surface 961.

While the designs provided herein are fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A disk drive comprising:
   drive housing;
   an actuator arm mounted to the drive housing;
   a spindle that is rotatably secured to the drive housing, the spindle being adapted to secure a storage disk having a storage surface; and
   a storage disk positioned on the spindle;
   wherein a distance is measured between the actuator arm and the spindle to determine an actual Z height between the actuator arm and a portion of the storage surface when the storage disk is secured to the spindle, wherein an adjustment to the actual Z height is made as a result of the measured distance and wherein the adjustment adjusts the position of the storage disk relative to the actuator arm.

2. The disk drive of claim 1 wherein the adjustment includes a spacer positioned on the spindle that maintains the storage disk spaced apart from a disk mounting surface of the spindle.

3. The disk drive of claim 2 wherein the spacer is selected from a group that includes a first spacer having a first spacer height and a second spacer having a second spacer height that is different from the first spacer height.

4. The disk drive of claim 2 wherein the spacer includes a plurality of annular sections.

5. The disk drive of claim 2 further comprising a head suspension assembly secured to the actuator arm, the head suspension assembly including a suspension and a slider, wherein a pitch static attitude of the slider is measured after the head suspension assembly has been secured to the drive housing.

6. The disk drive of claim 5 wherein the pitch static attitude of the slider is adjusted when the slider is at an actual Z height that is approximately equal to the position of a surface of the storage disk that contacts the spacer.

7. The disk drive of claim 2 further comprising a head suspension assembly secured to the actuator arm, the head suspension assembly including a suspension and a slider, wherein a roll static attitude of the slider is measured after the head suspension assembly has been secured to the drive housing.

8. The disk drive of claim 7 wherein the roll static attitude of the slider is adjusted when the slider is at an actual Z height that is approximately equal to the position of a surface of the storage disk that contacts the spacer.

9. The disk drive of claim 2 wherein the spacer is rigid.

10. The disk drive of claim 9 wherein only one storage disk is secured to the spindle.

11. The disk drive of claim 10 wherein the storage disk includes only one storage surface.

12. The disk drive of claim 11 wherein the storage surface is positioned adjacent to the spacer.

13. The disk drive of claim 1 wherein the measured distance is an actual measured distance along a first axis between a suspension mounting side of the actuator arm and a disk mounting surface of the spindle, and the adjustment includes a spacer positioned on the spindle.

14. The disk drive of claim 13 wherein a desired Z height is approximately equal to Z and the spacer has a spacer height that is approximately equal to the actual measured distance plus Z.

15. The disk drive of claim 13 wherein the spacer is selected from a group that includes a first spacer having a first spacer height and a second spacer having a second spacer height that is different from the first spacer height and wherein if the actual measured distance is equal to X1, the first spacer is positioned on the spindle; and wherein if the actual measured distance is equal to X2, the second spacer is positioned on the spindle.

16. The disk drive of claim 1 further comprising a head suspension assembly secured to the actuator arm, the head suspension assembly including a suspension and a slider, wherein a gram load of the head suspension assembly is measured after the head suspension assembly has been secured to the actuator arm.

17. The disk drive of claim 1 wherein the gram load is adjusted when the slider is at an actual Z height.

18. A disk drive comprising:
    a drive housing;
    an actuator arm mounted to the drive housing, the actuator arm including a suspension mounting side;
    a head suspension assembly that is secured to the suspension mounting side of the actuator arm;
    a spindle that is rotatably secured to the drive housing, the spindle having a disk mounting surface;
    a storage disk positioned on the spindle; and
    a spacer that maintains the storage disk spaced apart from the disk mounting surface, wherein the spacer is selected from a group that includes a first spacer having a first spacer height and a second spacer having a second spacer height that is different from the first spacer height.

19. The disk drive of claim 18 wherein an actual measured distance along a first axis between the suspension mounting side and the disk mounting surface is measured.

20. The disk drive of claim 19 wherein a desired Z height between the suspension mounting side and a surface of the storage disk that contacts the spacer is equal to Z and wherein the first spacer is positioned on the spindle if the first spacer height is closer than the second spacer height to the actual measured distance plus Z.

21. The disk drive of claim 20 wherein the second spacer is positioned on the spindle if the second spacer height is closer than the first spacer height to the actual measured distance plus Z.

22. The disk drive of claim 19 wherein if actual measured distance is equal to X1, the first spacer is positioned on the spindle; and wherein if the actual measured distance is equal to X2, the second spacer is positioned on the spindle.

23. The disk drive of claim 18 wherein the spacer is rigid.

24. The disk drive of claim 23 wherein only one storage disk is secured to the spindle.

25. The disk drive of claim 24 wherein the storage disk includes only one storage surface.

26. The disk drive of claim 25 wherein the storage surface is positioned adjacent to the spacer.

27. The disk drive of claim 18 further comprising a head suspension assembly secured to the actuator arm, the head suspension assembly including a suspension and a slider, wherein at least one of a gram load, a pitch static attitude and a roll static attitude is measured after the head suspension assembly has been secured to the drive housing.

28. The disk drive of claim 27 wherein at least one of the gram load, the pitch static attitude and the roll static attitude is adjusted when the slider is at an actual Z height that is approximately equal to the position of a surface of the storage disk that contacts the spacer.

29. A combination comprising:
a single disk, first disk drive comprising (i) a first drive housing; (ii) a first actuator arm mounted to the first drive housing, the first actuator arm including a first suspension mounting side; (iii) a first head suspension assembly that is secured to the first suspension mounting side; (iv) a first spindle that is rotatably secured to the first drive housing, the first spindle having a first disk mounting surface; (v) a first storage disk positioned on the first spindle; and (vi) a first spacer that maintains the first storage disk spaced apart from the first disk mounting surface, the first spacer having a first spacer height; and
a single disk, second disk drive comprising: (i) a second drive housing that is substantially similar to the first drive housing; (ii) a second actuator arm mounted to the second drive housing, the second actuator arm including a second suspension mounting side, the second actuator arm being substantially similar to the first actuator arm; (iii) a second head suspension assembly that is secured to the second suspension mounting side, the second suspension assembly being substantially similar to the first suspension assembly; (iv) a second spindle that is rotatably secured to the second drive housing, the second spindle having a second disk mounting surface; (v) a second storage disk positioned on the second spindle, the second storage disk being substantially similar to the first storage disk; and (vi) a second spacer that maintains the second storage disk spaced apart from the second disk mounting surface of the second spindle, the second spacer having a second spacer height that is greater than the first spacer height.

30. The combination of claim 29 wherein a first actual measured distance along a first axis between the first suspension mounting side and the first disk mounting surface is measured and wherein a second actual measured distance along the first axis between the second suspension mounting side and the second disk mounting surface is measured.

31. The combination of claim 30 wherein the second actual distance is greater than the first actual distance.

32. The combination of claim 29 wherein the first head suspension assembly includes a suspension and a slider, and wherein a gram load of the first head suspension assembly is measured after the first head suspension assembly has been secured to the first drive housing.

33. The combination of claim 32 wherein the gram load is adjusted when the slider is at an actual Z height that is approximately equal to the position of a surface of the storage disk that contacts the spacer.

34. The combination of claim 29 wherein the first head suspension assembly includes a suspension and a slider, wherein a static attitude of the slider is measured after the first head suspension assembly has been secured to the first drive housing.

35. The combination of claim 34 wherein the static attitude of the slider is adjusted when the slider is at an actual Z height that is approximately equal to the position of a surface of the storage disk that contacts the spacer.

36. A method for manufacturing a disk drive that uses a storage disk, the method comprising the steps of:
providing a drive housing;
rotatably securing a spindle to the drive housing, the spindle having a disk mounting surface;
rotatably securing an actuator arm to the drive housing, the actuator arm having a suspension mounting side; and
measuring to determine the position of the suspension mounting side relative to the disk mounting surface prior to positioning the storage disk within the drive housing.

37. A method for manufacturing a disk drive, the method comprising the steps of:
providing a drive housing;
rotatable securing a spindle to the drive housing, the spindle having a disk mounting surface;
rotatable securing an actuator arm to the drive housing, the actuator arm having a suspension mounting side; and
measuring to determine the position of the suspension mounting side relative to the disk mounting surface; and
positioning a spacer on the spindle against the disk mounting surface, the spacer having a spacer height that is based upon the position of the suspension mounting side relative to the disk mounting surface.

38. The method of claim 37 further comprising the step of selecting a spacer from a group that includes a first spacer having a first spacer height and a second spacer having a second spacer height that is different from the first spacer height.

39. The method of claim 37 further comprising the step of positioning a rigid spacer on the spindle against the disk mounting surface and the step of positioning a storage disk on the spindle against the spacer.

40. The method of claim 37 further comprising the step of measuring at least one of a gram load, a pitch static attitude and a roll static attitude after the head arm assembly has been secured to the drive housing.

41. The method of claim 37 further comprising the step of adjusting at least one of a gram load, a pitch static attitude and a roll static attitude with the slider maintained at an actual Z height that is determined in part by the positioning of the spacer.

42. A method for manufacturing a disk drive having a desired Z height, the method comprising the steps of:
providing a drive housing;
rotatably securing a spindle to the drive housing, the spindle having a disk mounting surface;
rotatably securing an actuator arm to the drive housing, the actuator arm having a suspension mounting side;
measuring an actual measured distance along a first axis between the suspension mounting side and the disk mounting surface;
providing a first spacer having a first spacer height;
providing a second spacer having a second spacer height that is different from the first spacer height;
positioning the first spacer on the spindle against the disk mounting surface if the first spacer height is closer than the second spacer height to the actual measured distance plus the desired Z height; and positioning the second spacer on the spindle against the disk mounting surface if the second spacer height is closer than the first spacer height to the actual measured distance plus the desired Z height.

43. The method of claim 42 further comprising the step of positioning a storage disk against the spacer, the storage disk having a single storage surface.

44. The method of claim 42 further comprising the step of securing a suspension and a slider to the actuator arm and measuring at least one of a gram load, a pitch static attitude and a roll static attitude after the suspension, slider, and actuator arm has been secured to the drive housing.

45. The method of claim 44 further comprising the step of adjusting at least one of a gram load, a pitch static attitude and a roll static attitude with the slider maintained at an actual Z height that is approximately equal to the position of the storage surface of the storage disk.

46. A method for manufacturing a disk drive, the method comprising the steps of:
providing a drive housing;
rotatable coupling a head arm assembly to the drive housing, the head arm assembly including a suspension;
measuring at least one of a gram load, a pitch static attitude and a roll static attitude after the head arm assembly has been secured to the drive housing but before a storage disk is coupled to the drive housing;
providing a spindle having a disk mounting surface;
positioning a spacer on the spindle against the disk mounting surface; and
positioning the storage disk on the spindle against the spacer.

47. The method of claim 46 further comprising the step of selecting the spacer from a group that includes a first spacer having a first spacer height and a second spacer having a second spacer height that is different from the first spacer height.

48. The method of claim 47 further comprising the step of adjusting at least one of the gram load, the pitch static attitude and the roll static attitude with the suspension maintained to support a slider at an actual Z height that is approximately equal to the position of a surface of the storage disk that contacts the spacer.

49. A disk drive comprising:
a drive housing;
an actuator arm mounted to the drive housing;
a spindle that is rotatably secured to the drive housing, the spindle being adapted to secure a storage disk having a storage surface; and
a spacer that is positioned on the spindle, the spacer being selected from a group that includes a first spacer having a first spacer height and a second spacer having a second spacer height that is different from the first spacer height;
wherein a distance is measured between the actuator arm and the spindle to determine an actual Z height between the actuator arm and a portion of the storage surface when the storage disk is secured to the spindle, and wherein the spacer is selected as a result of the measured distance to maintain the storage disk spaced apart from a disk mounting surface of the spindle.

50. A disk drive comprising:
a drive housing;
an actuator arm mounted to the drive housing; and
a spindle that is rotatably secured to the drive housing, the spindle being adapted to secure a storage disk having a storage surface;
wherein a distance is measured between the actuator arm and the spindle to determine an actual Z height between the actuator arm and a portion of the storage surface when the storage disk is secured to the spindle, and wherein an adjustment to the actual Z height is made as a result of the measured distance, the adjustment including a spacer positioned on the spindle that maintains the storage disk spaced apart from a disk mounting surface of the spindle, the spacer including a plurality of annular sections.

51. A disk drive comprising:
a drive housing;
an actuator arm mounted to the drive housing; and
a spindle that is rotatably secured to the drive housing, the spindle being adapted to secure a storage disk having a storage surface;
wherein a distance is measured along a first axis between a suspension mounting side of the actuator arm and a disk mounting surface of the spindle to determine an actual Z height between the actuator arm and a portion of the storage surface when the storage disk is secured to the spindle, an adjustment to the actual Z height being made as a result of the measured distance, the adjustment including a spacer positioned on the spindle, and wherein a desired Z height is approximately equal to Z, the spacer having a spacer height that is approximately equal to the measured distance plus Z.

52. The disk drive of claim 51 wherein the spacer is selected from a group that includes a first spacer having a first spacer height and a second spacer having a second spacer height that is different from the first spacer height and wherein the first spacer is positioned on the spindle if the first spacer height is closer than the second spacer height to the actual measured distance plus Z and wherein the second spacer is positioned on the spindle if the second spacer height is closer than the first spacer height to the actual measured distance plus Z.

53. A disk drive comprising:
a drive housing;
an actuator arm mounted to the drive housing; and
a spindle that is rotatably secured to the drive housing, the spindle being adapted to secure a storage disk having a storage surface;
wherein a distance is measured between along a first axis between a suspension mounting side of the actuator arm and a disk mounting surface of the spindle to determine an actual Z height between the actuator arm and a portion of the storage surface when the storage disk is secured to the spindle, and wherein an adjustment to the actual Z height is made as a result of the measured distance, the adjustment including a spacer positioned on the spindle, the spacer being selected from a group that includes a first spacer having a first spacer height and a second spacer having a second spacer height that is different from the first spacer height and wherein if the measured distance is equal to X1, the first spacer is positioned on the spindle; and wherein if the measured distance is equal to X2, the second spacer is positioned on the spindle.

54. A single head disk drive comprising:
a drive housing;
an actuator arm mounted to the drive housing, the actuator arm including a suspension mounting side;
a head suspension assembly that is secured to the suspension mounting side of the actuator arm;

a spindle that is rotatably secured to the drive housing, the spindle having a disk mounting surface;

a single storage disk positioned on the spindle, the storage disk having a storage surface; and a rigid spacer that maintains the storage disk spaced apart from the disk mounting surface;

wherein an actual measured distance along a first axis between the suspension mounting side and the disk mounting surface is measured, and wherein the spacer has a spacer height along the first axis that is based upon the actual measured distance.

55. The disk drive of claim 54 wherein the spacer height is equal to between approximately 23 mils and 43 mils plus the actual measured distance.

56. The disk drive of claim 55 wherein an actual measured distance along a first axis between the suspension mounting side and the disk mounting surface is measured, and the spacer is selected from a group that includes a first spacer having a first spacer height and a second spacer having a second spacer height that is different from the first spacer height.

57. The disk drive of claim 56 wherein if the actual measured distance is equal to X1, the first spacer is positioned on the spindle; and wherein if the actual measured distance is equal to X2, the second spacer is positioned on the spindle, and wherein X1 is less than X2, and the first spacer height is less than the second spacer height.

58. A single head disk drive comprising:

a drive housing;

an actuator arm mounted to the drive housing, the actuator arm including a suspension mounting side;

a head suspension assembly that is secured to the suspension mounting side of the actuator arm, the head suspension assembly including a suspension and a slider, wherein a gram load of the head suspension assembly is measured after the head suspension assembly has been secured to the drive housing;

a spindle that is rotatably secured to the drive housing, the spindle having a disk mounting surface;

a single storage disk positioned on the spindle, the storage disk having a storage surface; and a rigid spacer that maintains the storage disk spaced apart from the disk mounting surface;

wherein the gram load is adjusted when the slider is at an actual Z height that is approximately equal to the position of a surface of the storage disk that contacts the spacer.

59. A single head disk drive comprising:

a drive housing;

an actuator arm mounted to the drive housing, the actuator arm including a suspension mounting side;

a head suspension assembly that is secured to the suspension mounting side of the actuator arm, the head suspension assembly including a suspension and a slider, wherein a static attitude of the slider is measured after the head suspension assembly has been secured to the drive housing;

a spindle that is rotatably secured to the drive housing, the spindle having a disk mounting surface;

a single storage disk positioned on the spindle, the storage disk having a storage surface; and a rigid spacer that maintains the storage disk spaced apart from the disk mounting surface;

wherein the static attitude of the slider is adjusted when the slider is at an actual Z height that is approximately equal to the position of a surface of the storage disk that contacts the spacer.

60. A disk drive comprising:

a drive housing;

an actuator arm mounted to the drive housing;

a spindle that is rotatably secured to the drive housing, the spindle being adapted to secure a storage disk having a storage surface;

a storage disk positioned on the spindle; and a spacer having a thickness, the spacer adjusting the relative position between the actuator arm and the storage disk;

wherein a distance is measured between the actuator arm and the spindle to determine an actual Z height between the actuator arm and a portion of the storage surface when the storage disk is secured to the spindle, and wherein the thickness of the spacer is based at least partially on the measured distance.

* * * * *

UNITED STATES PATENT AND TRADEMARK OFFICE
CERTIFICATE OF CORRECTION

PATENT NO.       : 6,798,613 B1
APPLICATION NO.  : 10/075211
DATED            : September 28, 2004
INVENTOR(S)      : Krajnovich et al.

Page 1 of 1

It is certified that error appears in the above-identified patent and that said Letters Patent is hereby corrected as shown below:

In Claim 1 (Column 13, line 19), before the phrase "drive housing", please insert --a--.

In Claim 53, (Column 18, line 45), after the phrase "is measured", please delete the word -- between--.

Signed and Sealed this

Twenty-ninth Day of August, 2006

JON W. DUDAS
*Director of the United States Patent and Trademark Office*